UNITED STATES PATENT OFFICE.

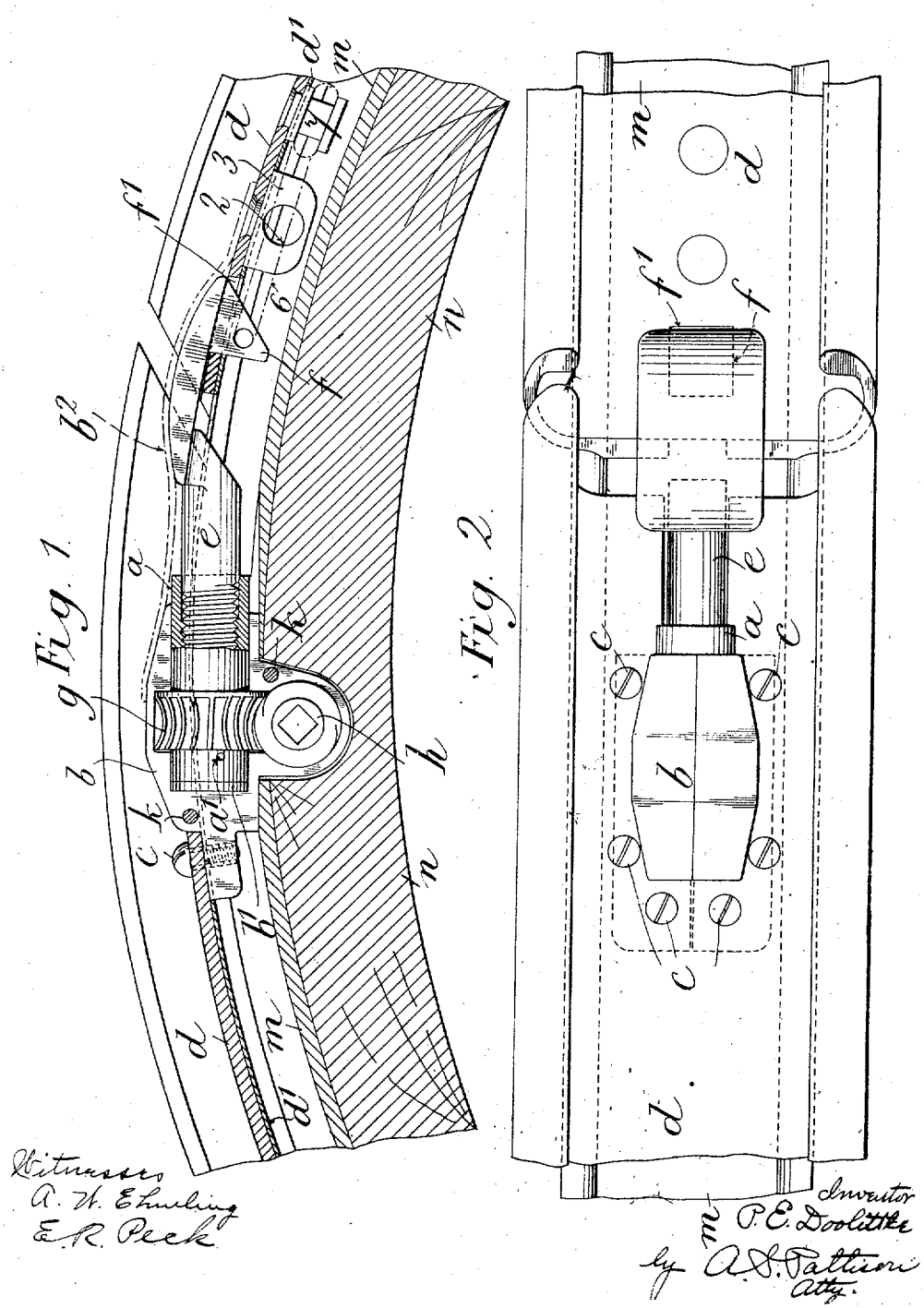

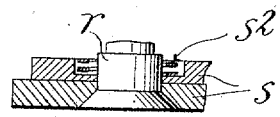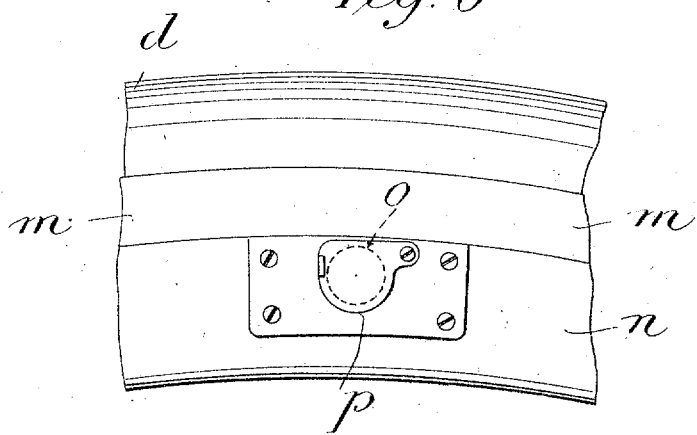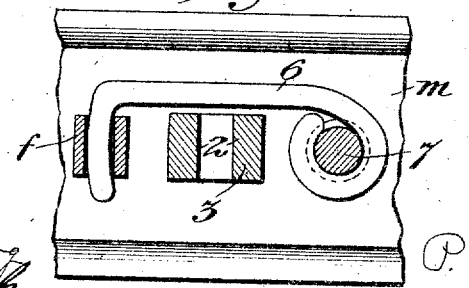

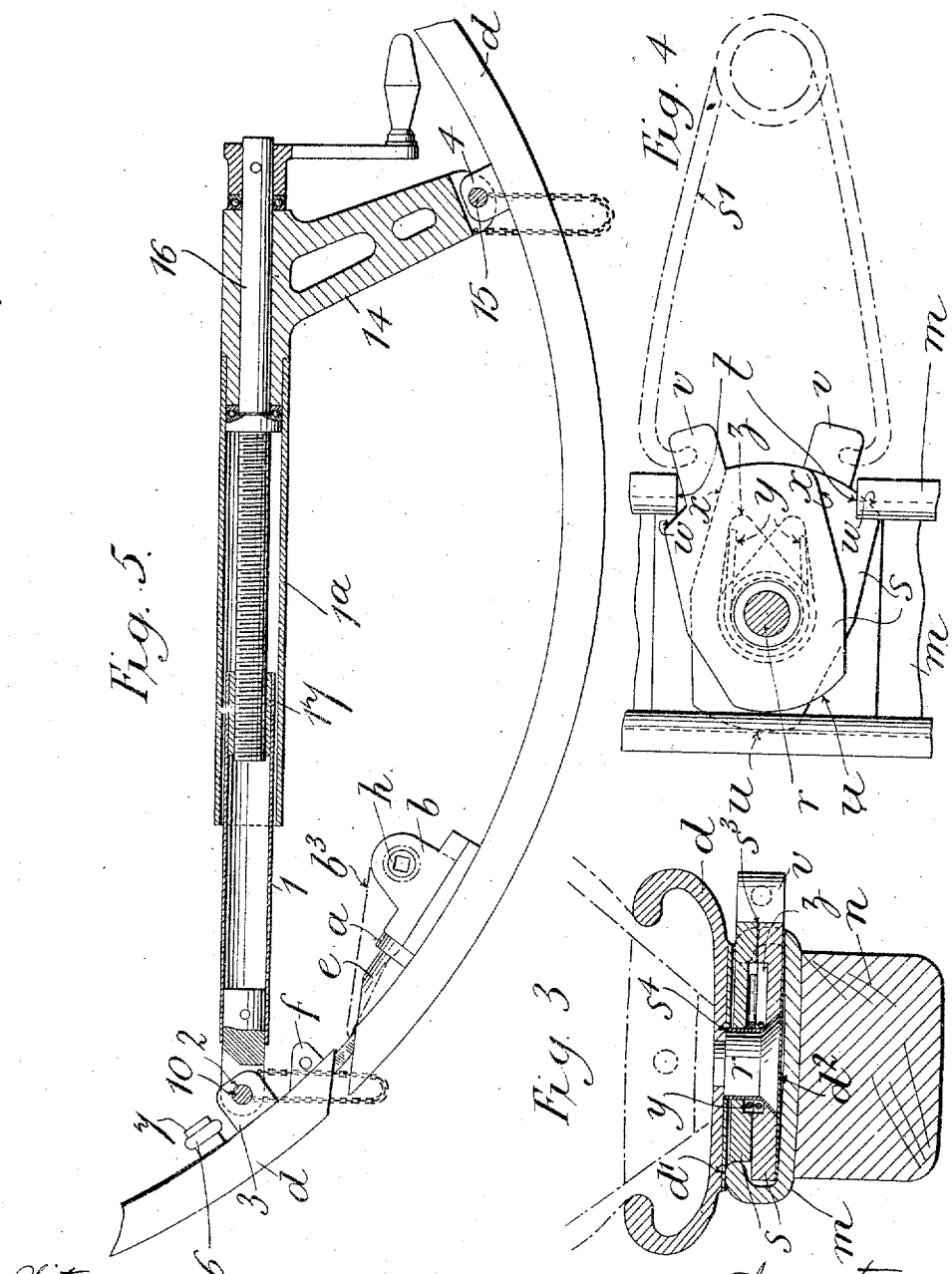

PERRY ERNEST DOOLITTLE, OF ONTARIO, CANADA, ASSIGNOR, BY MESNE ASSIGNMENTS, TO DOOLITTLE RIM CO. LTD.

DETACHABLE RIM FOR PNEUMATIC TIRES.

1,018,238.      Specification of Letters Patent.      Patented Feb. 20, 1912.

Application filed October 8, 1908. Serial No. 456,785.

*To all whom it may concern:*

Be it known that I, PERRY ERNEST DOOLITTLE, a subject of the King of Great Britain and Ireland, residing in Ontario, Canada, have invented Improvements in or Relating to Detachable Rims for Pneumatic Tires, of which the following is a specification.

This invention has reference to means for carrying pneumatic tires of the kind comprising a transversely divided rim in which the base of the outer cover of the tire engages and which is capable of being slightly expanded while the tire is carried by it so as to enable it to be placed in position on the wheel felly and of being contracted by suitable means so as to grip the felly and thus be retained in place thereon, the said rim being so constructed as to enable the tire to be easily removed therefrom for repair or otherwise by being still further contracted.

Objects of the present invention are to provide means for expanding and contracting the divided rim to enable it to be secured to fellies of slightly different sizes without special adjustment, and to provide improved means for preventing lateral movement of the divided rim upon the wheel and improved means whereby the rim when removed can be positively contracted to a still smaller diameter for the purpose of easy removal of the cover. According thereto one part of a screw coupling is connected to one end portion of the divided rim (which connection may be a detachable one) and the other end portion of the divided rim carries in a suitable bracket fixed thereto the other part of the screw coupling and means whereby the same can be rotated to expand and contract the rim, the arrangement being such that the screw coupling arrangement lies within a fixed rim of channel or gutter section which is fixed upon or forms the wheel rim or felly, one side of which is formed with an opening of sufficient size to enable a key or the like to be applied to the means through which the coupling is actuated. With such an arrangement the divided rims can be tightly contracted on to wheel rims of slightly varying sizes.

Figure 1 of the accompanying illustrative drawings shows in central longitudinal section a portion of a wheel rim embodying this invention. Fig. 1ª is a detail view to which reference will be hereinafter made. Fig. 2 shows the same in plan. Fig. 3 is a transverse section and Fig. 4 a sectional plan, showing a construction of device adapted to prevent the divided rim moving laterally upon the fixed rim. Fig. 3ª is a detail view hereinafter referred to. Fig. 5 shows in elevation and to a smaller scale a portion of the divided rim fitted with a device for contracting the divided rim when detached from the wheel to enable the tire to be easily removed or replaced and forcibly expanding the rim in the tire. Fig. 6 is a detail view to which reference will hereinafter be made.

Referring to Figs. 1 and 2, $a$ is a screwed sleeve mounted to rotate but not move endwise in a bracket $b$ that is fixed by screws $c$ to one end of the divided rim $d$. $e$ is a screwed spindle that engages the sleeve $b$ and is connected to the other end of the divided rim $d$ as by an inwardly extending lug $f$ on the spindle passing through a hole $f^1$ formed in the rim end. The sleeve $b$ is formed with a worm wheel $g$ engaged by a worm spindle $h$ mounted transversely in the bracket $b$, which is provided with suitable bearings for the sleeve $a$ and worm spindle $h$ and which is conveniently formed in halves as shown, screws $k$ connecting the two halves together. $b^1$ is a fiber washer forming a thrust bearing between the one end of the bracket $b$ and the adjacent closed end of the sleeve $a$, which latter nicely fits the open end of the bracket and so prevents the escape of grease with which the spaces within the bracket are filled. $a^1$ is a hole through which grease can pass from the sleeve $a$.

It will be seen that the coupling device lies as far as practicable within the channel or gutter of the rim $m$ which is fixed upon the wheel felly $n$, an opening $o$, Fig. 6, being formed in one side of the felly to enable an operating key to be fitted to a square hole in the spindle $h$. This opening may, as shown, be normally closed by a cover $p$ to prevent the entrance of dirt.

A rubber or other strip $b^2$, Fig. 1, may be arranged to cover the joint of the divided rim; such strip may be fixed at one end to the bracket $b$ or to the end portion of the rim $d$ adjacent to the bracket.

To prevent the divided rim $d$ moving laterally upon the fixed rim $m$, there are mounted on a radial pivot $r$, Figs. 3 and 4, extending from the inside of the divided rim $d$ a pair of plates $s$ arranged one upon the other and of such width as to be capable, while the divided rim $d$ is being applied to or withdrawn from the fixed rim $m$, of passing through a slot $t$ in a side wall of the fixed rim $m$ and of then being opened out fan-wise, Fig. 4, so as to engage with the said slotted side wall at opposite sides of the slot $r$ and prevent return movement of the rim. Each of the plates may conveniently be, as shown, of somewhat triangular shape with a rounded apex $u$ which bears against the unslotted side wall of the fixed rim $m$, and with an outward projection $v$ extending from near the middle of its base, which, on one side of the projection $v$, is curved at $w$ to a radius struck from the center of the pivot $r$ such that when the divided rim $d$ is pushed home on the felly the plates $s$ can be turned about their common pivot $r$ and the curved portions $w$ will then engage with the inside of the side wall of the fixed rim $m$ beyond the slot $t$. The plates are reversely arranged so that they are turned into and out of engagement in opposite directions and any tendency of the divided rim to move laterally will not tend to close the plates together.

$y$ is a spring located in recesses $z$ formed in the plates $s$ tending to open out the plates into their locking positions.

When the rim $d$ is being pushed home the inner part of the plates $s$ having entered the slot $t$ the sides of the plates will bear against the sides of the slot and the plates closed up until their curved portions $w$ are within the walls of the slot when the spring $y$ will again open out the plates and thus automatically lock the rim $d$ in position. The plates are of such thickness that, in conjunction with the projections $v$, which may be turned down in opposite directions, they close the slot $t$ in the fixed rim against the entry of dirt when the plates are opened out.

To enable the divided rim to be removed, the screw coupling is actuated to expand the rim $d$, the projections $v$ are pressed toward one another as by a spring tool $s^1$, Fig. 4, in order to move the plates $s$, against the action of the spring $y$, into their closed position when they are drawn through the slot $t$ as the rim $d$ is withdrawn from the rim $m$. The portion $x$ of the base of each plate forms a stop which by coming against the sides of the slot $t$ in the fixed rim limits the movement of the plate so that when the projections $v$ are held together the plates $s$ must be in position for removal.

In some cases the plates $s$ can be pressed together by a spring washer $s^2$, Fig. 3a, so that they will not be liable to accidental movement from their locking position. To withdraw the plates in such construction, the projections are tapped with a hammer or the like toward each other.

$d^1$ is a layer of fiber, vulcanite, raw hide or other yieldable resisting material interposed between the divided rim $d$ and the fixed rim $m$. $d^2$, Fig. 3, is a strip of similar material placed between the inner plate $s$ and the fixed rim $m$ to form a seat for the lateral movement preventing device and prevent vibration and the plates $s$ thereof being moved until the rim is slackened. $s^3$ and $s^4$ are respectively a washer and lining of fiber or other non-rusting material which will prevent the plates becoming bound by rust.

To enable the tire to be readily removed from the rim $d$ after such rim is removed from the fixed rim $m$ a contracting device for the rim $d$ is provided, such as shown in Fig. 5 and comprising a member 1 one end of which is provided with a pin 10 adapted to be inserted through a hole 2 formed in a block 3 fixed to one end of the divided rim $d$. Another member $1^a$ mounted to slide telescopically on the member 1 is formed with an arm 14 which is furnished with a pin 15 adapted to be inserted through a hole formed in a block 4 fixed to the other end of the divided rim.

16 is a spindle mounted to rotate but not move endwise in the member $1^a$, screwed at its inner end into a nut 17 carried by the member 1, and furnished with an operating handle at its outer end.

To prevent the one end portion catching against the other end portion and against the bracket $b$ as it moves inwardly upon contraction of the rim, a guide $b^3$ can be placed over the bracket $b$ as shown in dotted lines in Fig. 5, the end of the guide extending just over the inner edge of the adjacent rim end and the whole being held in place by the key inserted into the spindle $h$.

6, Figs. 1 and $1^a$, is a hook that is pivoted to a pin 7 fixed to the rim $d$ and the free end of which is adapted to engage the lug $f$ of the spindle $e$ and thereby prevent disengagement of such lug from the rim. The block 3 is so arranged in relation to the hook 6 that when the hook 6 engages the lug $f$ the hook extends across the hole in the block 3 so that the member 1 of the contracting device can not be connected to the block 3 until the hook 6 is disengaged from the lug $f$. When disengaged the hook prevents the divided rim being placed in position on the fixed rim thereby insuring the lug $f$ being locked in place before the rim $d$ is in position for use.

What I claim is:—

1. In a wheel for pneumatic tires, a fixed rim of channel or gutter section; a divided rim with expanding and contracting means comprising a screw coupling having a hook formed at one end engaging one end of the divided rim and releasable therefrom by contraction of the rim independently of the screw; a suitable bracket fixed to the other end portion of the divided rim in which bracket the other end of the screw coupling is suitably carried; and means whereby the coupling can be rotated to expand and contract the divided rim from outside said fixed rim.

2. In a wheel for pneumatic tires, a fixed rim of channel or gutter section, a divided rim, a bracket fixed near one end of said divided rim, a worm wheel mounted to rotate but not move endwise in said bracket, a worm gearing into said worm wheel, a worm spindle for said worm mounted transversely in said bracket, a screwed sleeve mounted in said bracket and on which said worm wheel is fixed, a screwed spindle working in said sleeve adapted to engage the other end of said divided rim, said bracket being mainly located within said fixed rim, and means whereby said worm spindle can be rotated from outside said fixed rim.

3. In a wheel for pneumatic tires, a fixed rim of channel or gutter section formed with a slot in one of its side walls; a divided rim; and means for preventing said divided rim moving laterally upon said fixed rim comprising a part carried by said divided rim and movable relative thereto, which part is capable of passing through the slot in the side wall of said fixed rim while the divided rim is being withdrawn from or applied to the wheel and which is adapted, when said divided rim is on said fixed rim, to move to engage the wall of said fixed rim adjacent to the slot.

4. In a wheel for pneumatic tires, a fixed rim of channel or gutter section formed with a slot in one of its side walls; a divided rim; a radial pivot extending from the inside of said divided rim; a pair of plates mounted on said radial pivot, arranged one above the other and of such width that when opened out fan-wise they engage with the slotted side wall of said fixed rim at opposite sides of the slot, while when moved together, they are capable of being passed or withdrawn through the slot.

5. In a wheel the combination of a fixed rim; a detachable rim; a spring actuated latch carried by said detachable rim retractable by contact with the fixed rim; and means on the fixed rim adapted to be engaged by the latch to hold the detachable rim against displacement when the latter has been slipped into place on the fixed rim.

6. In a wheel for pneumatic tires, a fixed rim with a slotted side wall, a divided rim, a radial pivot extending from the inside of said divided rim, a pair of plates mounted on said pivot arranged one above the other and of such width that when opened out fanwise they engage with the slotted wall of said fixed rim at opposite sides of said slot, and a spring tending to open said plates out fanwise.

7. In a wheel for pneumatic tires, a fixed rim with a slotted side wall, a divided rim, a radial pivot extending from the inside of said divided rim, a pair of plates mounted on said pivot arranged one above the other and of such width that when opened out fanwise they engage with the slotted wall of said fixed rim at opposite sides of said slot, each said plate being formed with a recess on its face adjacent to the other plate, and a spring located within the recesses of said plates tending to open said plates out fanwise.

8. In a wheel for pneumatic tires, a fixed rim, with a slotted side wall, a divided rim, a radial pivot extending from the inside of said divided rim, a pair of plates mounted on said pivot arranged one above the other and of such width that when opened out fanwise they engage with the slotted wall of said fixed rim at opposite sides of said slot, lugs on said plates extending through the slotted wall of said fixed rim adapted to be engaged by a spring tool whereby said plates can be moved together, and a spring tending to open said plates out fanwise.

9. In a wheel for pneumatic tires, a fixed rim, a divided rim, expanding and contracting means for said divided rim comprising a coupling one part of which is connected to one end portion of said divided rim and the other part of which is connected to the other end portion of said divided rim, a perforated block fixed to said divided rim near each end thereof, said blocks being adapted to be coupled to a rim contracting tool when said divided rim is removed from said fixed rim, by pins passed through the holes therein, and locking means adapted to prevent disengagement of said coupling from one end of said divided rim and to prevent the engagement of one of said blocks with said tool until said coupling part is released from said locking means.

10. In a wheel for pneumatic tires, a fixed rim, a divided rim, expanding and contracting means for said divided rim comprising a coupling one part of which is connected to one end portion of said divided rim and the other part of which is connected to the other end portion of said divided rim, a perforated block fixed to said divided rim near each end thereof, said blocks being adapted to be coupled to a rim contracting tool when said divided rim is removed from said fixed rim, by pins passed through the holes therein, a radial pin extending inwardly from said divided rim, and a hook mounted to turn on said pin and adapted to engage one part of said coupling when in engagement with the divided rim, said pin, one of said blocks and said coupling part engaged by said hook being so arranged that when said hook is in engagement with said coupling part it extends across the hole of said block.

11. In a wheel for pneumatic tires, a fixed rim, a divided rim, expanding and contracting means for said divided rim comprising a coupling one part of which is connected to one end portion of said divided rim and the other part of which is connected to the other end portion of said divided rim, a perforated block fixed to said divided rim near each end thereof, said blocks being adapted to be coupled to a rim contracting tool when said divided rim is removed from said fixed rim, by pins passed through the holes therein, a radial pin extending inwardly from said divided rim, and a hook mounted to turn on said pin and adapted to engage one part of said coupling when in engagement with the divided rim, said pin, one of said blocks and said coupling part engaged by said hook being so arranged that when said hook is in engagement with said coupling part it extends across the hole of said block, and said hook being adapted when disengaged from said coupling to obstruct the application of said divided rim to said fixed rim.

Signed at 46 Lincolns Inn Fields, London, England, this thirtieth day of September 1908.

PERRY ERNEST DOOLITTLE.

Witnesses:
 ARTHUR WOOSNAM,
 WILLIAM PRINGLE.